US012568298B2

(12) United States Patent
Zhu

(10) Patent No.: US 12,568,298 B2
(45) Date of Patent: Mar. 3, 2026

(54) CAMERA CONTROL METHOD AND APPARATUS

(71) Applicant: SHANGHAI FUSAIMENGYANG TECHNOLOGY CO., LTD., Shanghai (CN)

(72) Inventor: Winly Zhu, Shanghai (CN)

(73) Assignee: SHANGHAI FUSAIMENGYANG TECHNOLOGY CO., LTD., Shanghai (CN)

(*) Notice: Subject to any disclaimer, the term of this patent is extended or adjusted under 35 U.S.C. 154(b) by 155 days.

(21) Appl. No.: 18/567,041

(22) PCT Filed: Jun. 8, 2022

(86) PCT No.: PCT/CN2022/097515
§ 371 (c)(1),
(2) Date: Dec. 5, 2023

(87) PCT Pub. No.: WO2022/257945
PCT Pub. Date: Dec. 15, 2022

(65) Prior Publication Data
US 2024/0276090 A1 Aug. 15, 2024

(30) Foreign Application Priority Data
Jun. 11, 2021 (CN) .......................... 202110654528.0

(51) Int. Cl.
*H04N 23/57* (2023.01)
*H04N 23/695* (2023.01)
(52) U.S. Cl.
CPC ........... *H04N 23/57* (2023.01); *H04N 23/695* (2023.01)

(58) Field of Classification Search
CPC ...... H04N 23/57; H04N 23/695; H04N 23/60; H04M 1/0264
See application file for complete search history.

(56) References Cited

FOREIGN PATENT DOCUMENTS

| CN | 104349064 | A | | 2/2015 |
|----|-----------|---|---|--------|
| CN | 104954676 | A | * | 9/2015 |
| CN | 107819907 | Y | | 3/2018 |
| CN | 108737719 | Y | | 11/2018 |
| CN | 110213405 | A | | 9/2019 |
| CN | 110581938 | | | 12/2019 |

(Continued)

OTHER PUBLICATIONS

ISR of PCT/CN2022/097515.

*Primary Examiner* — Nasim N Nirjhar
(74) *Attorney, Agent, or Firm* — Hemisphere Law, PLLC

(57) ABSTRACT

The present disclosure discloses a camera control method and apparatus. The method includes: acquiring an instruction used for controlling a camera; acquiring a current state of the camera, wherein the state includes at least one of: an extending and retracting state of the camera and a rotating state of the camera, the camera is hidden inside a mobile terminal after retracting, and the camera can be driven to extend, retract, and rotate; and adjusting the current state of the camera according to the instruction. The present disclosure solves the problem of lack of a camera control method because technicians do not realize that the camera needs to be controlled, enriches the camera control methods, improves the applicability of the camera, and provides a possibility for better photographing.

15 Claims, 5 Drawing Sheets

(56) References Cited

FOREIGN PATENT DOCUMENTS

| | | | | | |
|----|----|----|----|----|----|
| CN | 112104807 | A | | 12/2020 | |
| CN | 112449039 | A | | 3/2021 | |
| CN | 110505378 | B | * | 5/2021 | ............. H04N 23/57 |
| CN | 113395373 | | | 9/2021 | |
| JP | 2017034719 | A | | 2/2017 | |
| WO | WO-2020215591 | A1 | * | 10/2020 | ............. H04N 23/57 |

* cited by examiner

Acquiring an instruction used for controlling a camera ⟋S502

Acquiring a current state of the camera ⟋S504

Adjusting the current state of the camera according to the instruction ⟋S506

CAMERA CONTROL METHOD AND APPARATUS

TECHNICAL FIELD

The present disclosure relates to the field of intelligent terminals, and in particular, to a camera control method and apparatus.

BACKGROUND

At present, a camera of a mobile terminal (or referred to as an intelligent terminal) is generally fixed on the intelligent terminal. For example, front and rear cameras are configured on a mobile phone; both a tablet and a laptop are provided with front cameras. These cameras are all fixed.

In the prior art, there is a camera that can be raised or lowered. Although the camera can move, the camera does not need to be controlled during actual use. When an operating system of the intelligent terminal senses that the camera is called, the camera automatically extends out; and when the camera is not used, the camera automatically retracts. The inventor has found that throughout the entire process, a user does not control the camera, and technicians do not realize that the camera needs to be controlled.

SUMMARY

The embodiments of the present disclosure provide a camera control method and apparatus, so as to at least solve the problem of lack of a camera control method because technicians do not realize that a camera needs to be controlled.

According to an aspect of the present disclosure, a camera control method is provided. The method includes: acquiring an instruction used for controlling a camera, wherein the camera is one of constituent parts of a mobile terminal; acquiring a current state of the camera, wherein the state includes at least one of: an extending and retracting state of the camera and a rotating state of the camera, the camera is hidden inside the mobile terminal after retracting, and the camera can be driven to extend, retract, and rotate; and adjusting the current state of the camera according to the instruction.

Further, the instruction is triggered by input information of a user of the mobile terminal, and the instruction is used for adjusting the state of the camera according to the input information; and/or, the instruction is triggered by a call command for calling the camera, wherein the call command is sent by an operating system of the mobile terminal or an application installed on the operating system, and the instruction is used for adjusting the state of the camera according to the call command.

Further, in a case that the instruction is used for instructing the camera to perform mobile photographing, the adjusting the current state of the camera according to the instruction includes: controlling the camera to adjust the state of the camera according to a direction and speed indicated by the instruction, so as to enable the camera to perform mobile photographing.

Further, in a case of controlling the camera to follow a photographing target, the method further includes: acquiring a movement of the photographing target at a predetermined cycle; and the acquiring an instruction used for controlling a camera and adjusting the current state of the camera according to the instruction includes: acquiring the instruction at the predetermined cycle, and adjusting the current state of the camera according to the acquired instruction, wherein adjustment, indicated by the instruction, of the extending and retracting state and/or rotating state is performed according to the movement of the photographing target; and the adjusted camera follows the photographing target.

Further, the adjusting the current state of the camera according to the instruction includes: controlling the camera to maintain the current state according to the instruction, and performing photographing; and/or, in a case that the instruction is used for instructing the camera to adjust the extending and retracting state and/or rotating state, controlling, according to the instruction, the camera to adjust the state in one of the following ways: controlling the camera to adjust the rotating state after adjusting the extending and retracting state, controlling the camera to adjust the extending and retracting state after adjusting the rotating state, controlling the camera to adjust both the extending and retracting state and the rotating state simultaneously, controlling the camera to only adjust the extending and retracting state, and controlling the camera to only adjust the rotating state; and/or, controlling, according to the instruction, the camera to be in a state of extending out of the mobile terminal, not retracting.

Further, the input information of the user of the mobile terminal includes: a touch signal input by the user on a touch screen, wherein the touch signal is a sliding signal, and the sliding signal is used for controlling a speed and/or angle of state adjustment of the camera.

Further, after the adjusting the current state of the camera according to the instruction, the method further includes: controlling the camera for photographing or framing; and controlling, after the photographing or framing is completed, the camera to be hidden inside the mobile terminal or to be in the same state after the photographing or framing is completed, or controlling the camera to be adjusted to the state before the instruction is received.

Further, the camera can be driven by at least one motor to extend, retract, and rotate.

According to another aspect of the present disclosure, a mobile terminal is provided, including a screen, a memory, and a processor, further including: a communication module, configured to achieve communication through a network, wherein the network includes at least one of the following: a mobile communication network, a wireless network, a wired network; a camera, wherein the camera is hidden inside the mobile terminal after retracting, and the camera can be driven to extend, retract, and rotate; and software, wherein the software is used for performing the method described above.

Further, the memory, the communication module, and the processor are arranged on an integrated circuit board; one surface of the mobile terminal is the screen, and the other surface of the mobile terminal is a back shell; and the memory, the communication module, the processor, the integrated circuit board, and the camera are located in an interior composed of the screen and the back shell.

According to another aspect of the present disclosure, an electronic device is provided. The electronic device is a processor or a memory, wherein in a case that the electronic device is the processor, the electronic device is configured to execute software; in a case that the electronic device is the memory, the electronic device is configured to store software; and the software is used for performing the method described above.

According to another aspect of the present disclosure, a camera control apparatus is provided, including: a first acquisition module, configured to acquire an instruction used for controlling a camera, wherein the camera is arranged on a mobile terminal; a second acquisition module, configured to acquire a current state of the camera, wherein the state includes at least one of: an extending and retracting state of the camera and a rotating state of the camera, the camera is hidden inside the mobile terminal after retracting, and the camera can be driven to extend, retract, and rotate; and an adjustment module, configured to adjust the current state of the camera according to the instruction.

In the embodiments of the present disclosure, an instruction used for controlling a camera is acquired; a current state of the camera is acquired, wherein the state includes at least one of: an extending and retracting state of the camera and a rotating state of the camera, the camera is hidden inside a mobile terminal after retracting, and the camera can be driven to extend, retract, and rotate; and the current state of the camera is adjusted according to the instruction. The present disclosure solves the problem of lack of a camera control method because technicians do not realize that the camera needs to be controlled, enriches the camera control methods, improves the applicability of the camera, and provides a possibility for better photographing.

BRIEF DESCRIPTION OF THE DRAWINGS

The accompanying drawings forming a part of the present disclosure are used to provide a further understanding of the present disclosure, and the illustrative embodiments and their explanations of the present disclosure are used to explain the present disclosure and do not constitute an improper limitation on the present disclosure. In the drawings.

From FIG. 1 to FIG. 4: 1: mobile phone main body; 2: fixed device; 3: lifting structure main body; 4: clamping tooth; 5: double-ended motor; 6: rotating rod; 7: rotating bearing; 8: rotating gear; 9: transmission bearing; 10: transmission rod; 11: transmission motor; 12: camera main body; 13: matching slot; 14: power cable; 15: supporting ring; 16: sealing gasket; 17: extending and retraction opening; 18: movable sealing plate; 19: rotating slot; 20: rotating block; 21: chute; 22: rotating seat; 23: sliding block; and 24: transmission wire.

DETAILED DESCRIPTION OF THE EMBODIMENTS

It should be noted that the embodiments in the present application and features in the embodiments may be mutually combined without conflicts. The present disclosure will be described in detail below with reference to the accompanying drawings and the embodiments. In order to make a person skilled in the art to better understand the solutions of the present disclosure, the technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of this application without making creative efforts shall fall within the protection scope of this application.

Figure 1:
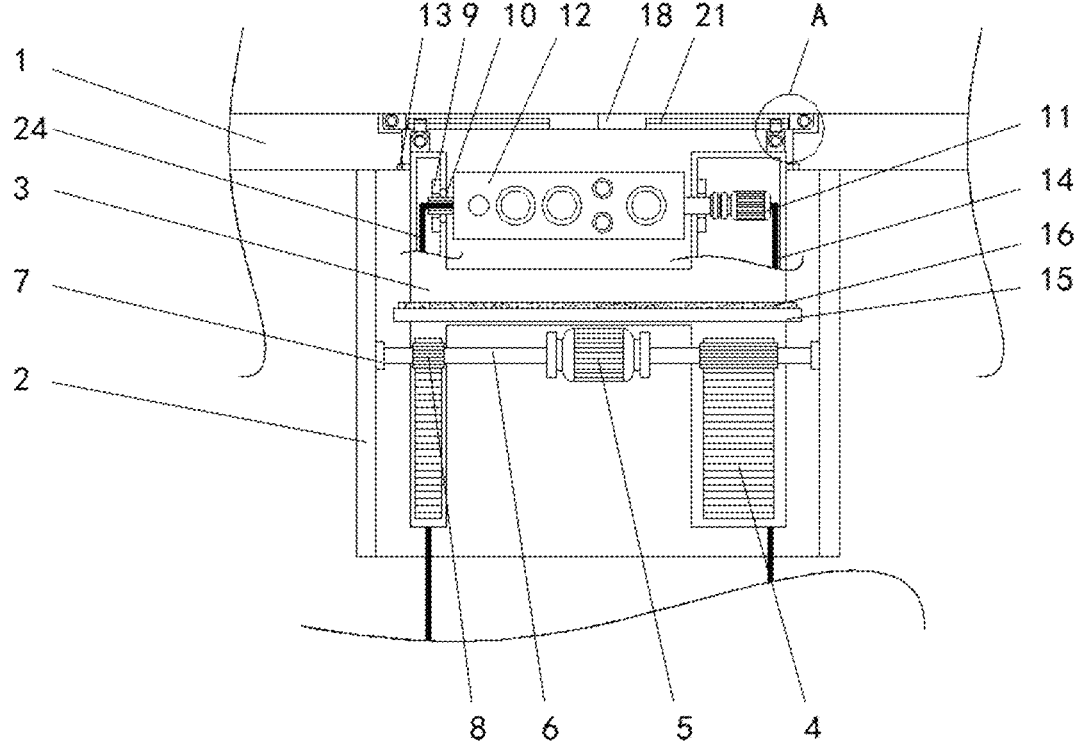
FIG. 1 is a cross-sectional view of a mobile phone camera structure capable of protecting a camera and achieving multi-angle photographing according to an embodiment of the present disclosure.
Figure 2:
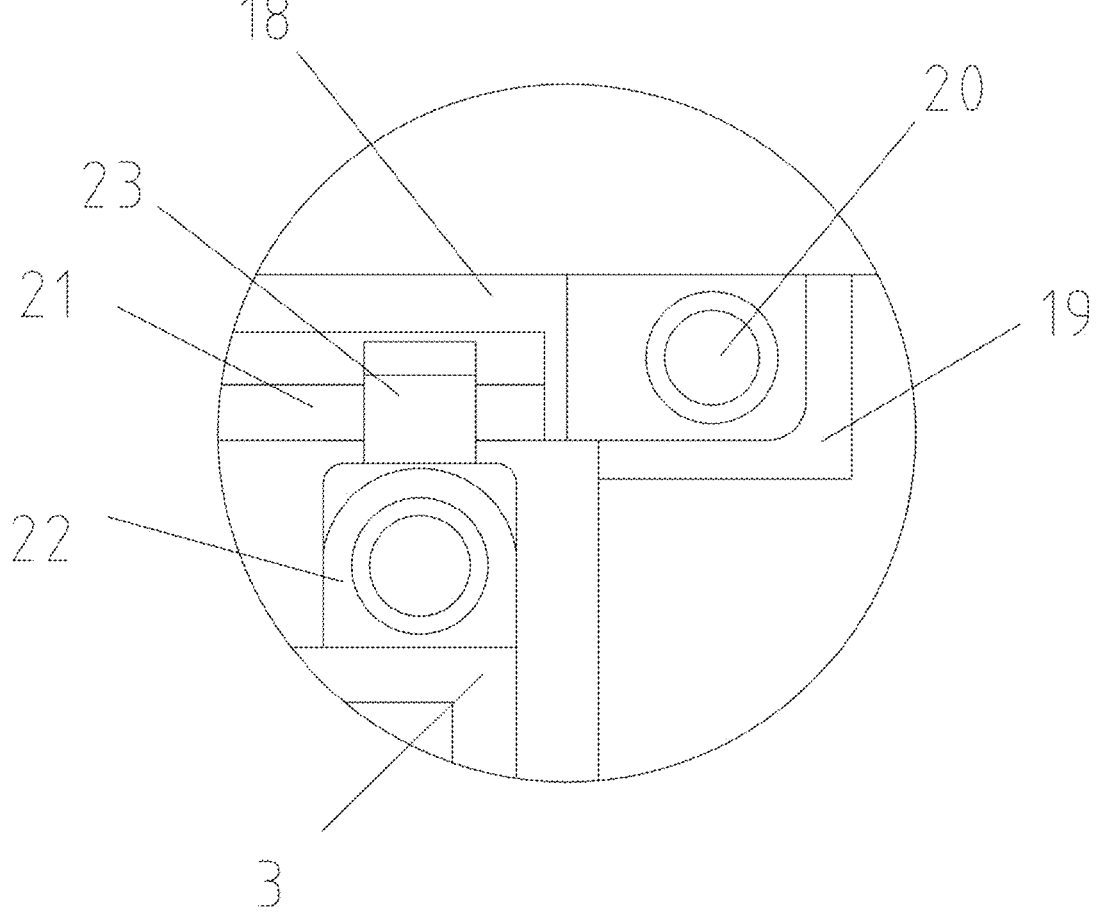
FIG. 2 is a schematic structural diagram of A in FIG. 1 of the cross-sectional view of the mobile phone camera structure capable of protecting the camera and achieving the multi-angle photographing according to an embodiment of the present disclosure.
Figure 3:
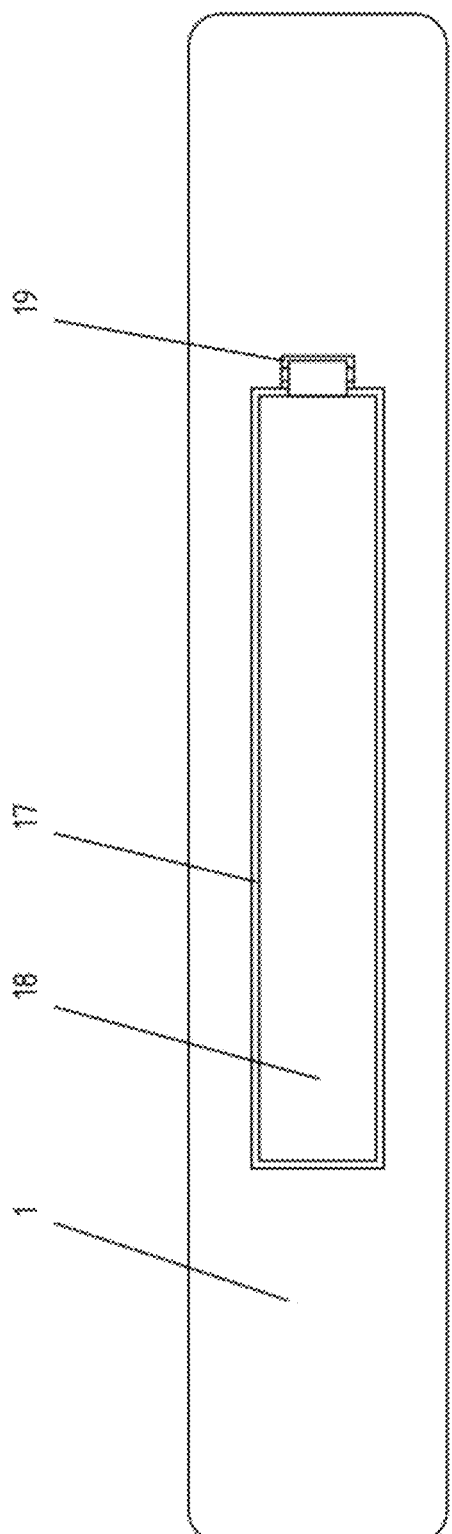
FIG. 3 is a top view of a mobile phone camera structure capable of protecting a camera and achieving multi-angle photographing according to an embodiment of the present disclosure.
Figure 4:
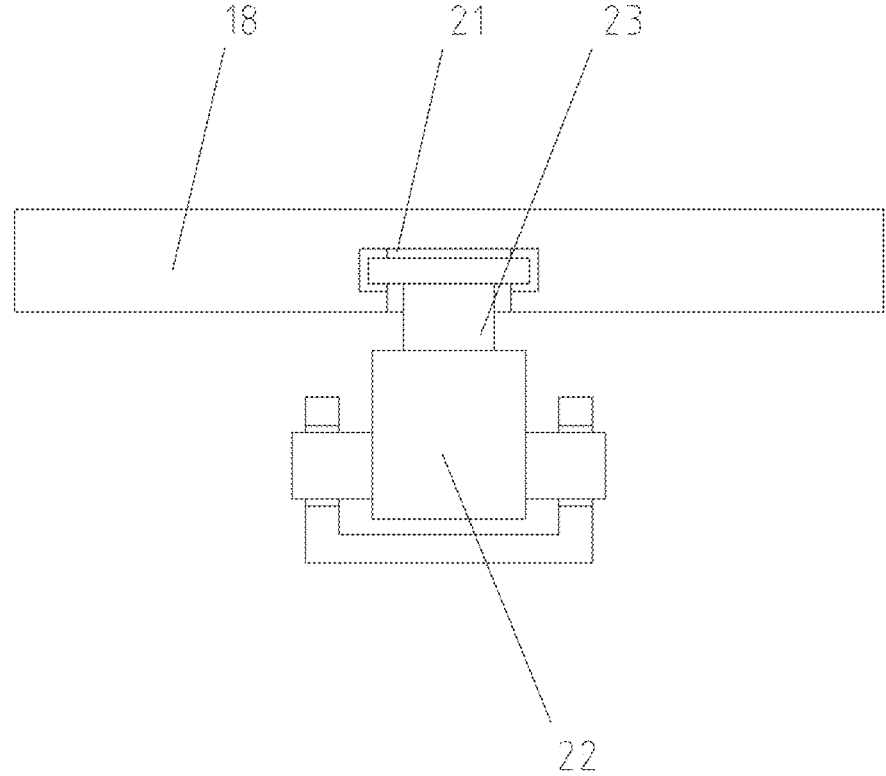
FIG. 4 is a schematic structural diagram of a rotating seat of a mobile phone camera structure capable of protecting a camera and achieving multi-angle photographing according to an embodiment of the present disclosure.

A method in the following embodiments is applicable to various cameras with lifting and flip structures. For example, this embodiment provides a structure of a camera below. FIG. 1 to FIG. 4 all show the structure of the camera. FIG. 1 is a cross-sectional view of a mobile phone camera structure capable of protecting a camera and achieving multi-angle photographing according to an embodiment of the present disclosure; FIG. 2 is a schematic structural diagram of A in FIG. 1 of the cross-sectional view of the mobile phone camera structure capable of protecting the camera and achieving the multi-angle photographing according to an embodiment of the present disclosure; FIG. 3 is a top view of a mobile phone camera structure capable of protecting a camera and achieving multi-angle photographing according to an embodiment of the present disclosure; and FIG. 4 is a schematic structural diagram of a rotating seat of a mobile phone camera structure capable of protecting a camera and achieving multi-angle photographing according to an embodiment of the present disclosure The structure will be explained below in conjunction with the above accompanying drawings.

FIG. 1 to FIG. 4 show a mobile phone camera structure capable of protecting a camera and achieving multi-angle photographing. The mobile phone camera structure includes a mobile phone main body 1. A fixed device 2 is fixedly mounted inside the mobile phone main body 1. A lifting structure main body 3 is movably mounted inside the fixed device 2. The lifting structure main body 3 is H-shaped, and the lifting structure main body 3 is internally hollow. Front faces of left and right sides of a bottom of the fixed device 2 are fixedly connected with clamping teeth 4. A double-ended motor 5 located on a front surface of the lifting structure main body 3 is fixedly mounted inside the fixed device 2. Output shafts of left and right sides of the double-ended motor 5 are fixedly connected with rotating rods 6. Rotating bearings 7 that are movably connected to the rotating rods 6 are fixedly mounted on inner walls of the left and right sides of the fixed device 2, and rotating gears 8 are fixedly mounted outside the two rotating rods 6. The rotating gears 8 are matched with the clamping teeth 4. The rotating gears 8 are engaged with the clamping teeth 4. Transmission bearings 9 are fixedly mounted on inner walls of left and right sides of the lifting structure main body 3. Transmission rods 10 are movably mounted inside the two transmission bearings 9. A transmission motor 11 is fixedly mounted on a left side in the lifting structure main body 3. The transmission rod 10 on the right side extends into the lifting structure main body 3 through the transmission bearing 9 on the right side, and an output shaft of the transmission motor 11 is fixedly connected to the transmission rod 10 on the right side through a shaft coupler. A camera main body 12 is fixedly connected between the two transmission rods 10. A matching slot 13 is formed in an inner top wall of the mobile phone main body 1, and a power cable 14 is movably mounted inside the lifting structure main body 3. A transmission wire 24 is movably mounted inside the lifting structure main body 3. Two ends of the power cable 14 are respectively fixedly connected to the transmission motor 11 and a mobile phone main board. Two ends of the transmission wire 24 are respectively fixedly connected to the camera main body 12 and the mobile phone main board. One camera main body 12 is movably mounted inside the mobile phone main body 1. The camera main body 12 is transversely arranged, and the camera main body 12 can rotate 360 degrees between the two transmission bearings 9 through the transmission rods 10. The camera main body 12 can be safely accommodated in the mobile phone main body 1. A supporting ring 15 is fixedly connected outside the lifting structure main body 3. A top of the supporting ring 15 is fixedly connected with a sealing gasket 16. A size of the sealing gasket 16 is matched with a size of the matching slot 13. An interior of the matching slot 13 is movably connected with the sealing gasket 16. An extending and retraction opening 17 is formed in a top of the mobile phone main body 1. Two movable sealing plates 18 are movably mounted inside the extending and retraction opening 17. Rotating slots 19 located at the top of the mobile phone main body 1 are formed in left and right sides of the extending and retraction opening 17. Front and back surfaces of sides of the two movable sealing plates 18 that are separated from each other are fixedly connected with rotating blocks 20 that are movably connected to the rotating slots 19. Front and back walls of the rotating slots 19 are provided with rotating holes that are matched with the rotating blocks 20, and the rotating slots 19 are movably connected to the rotating blocks 20 through the rotating holes. Chutes 21 are formed in bottoms of the movable sealing plates 18. Left and right sides of a top of the lifting structure main body 3 are fixedly connected with rotating seats 22. Tops of the rotating seats 22 are fixedly connected with sliding blocks 23. The sliding blocks 23 are matched with the chutes 21. Interiors of the chutes 21 are movably connected with the sliding blocks 23.

According to the mobile phone camera structure capable of protecting the camera and achieving multi-angle photographing, the fixed device 2 is arranged inside the mobile phone main body 1, and the double-ended motor 5, the rotating rods 6, the rotating bearings 7, and the rotating gears 8 are arranged inside the fixed device 2, so that it is convenient for the two rotating rods 6 to rotate inside the fixed device 2 through the double-ended motor 5 and the rotating bearings 7, thus driving the rotating gears 8 outside the rotating rods to rotate. The lifting structure main body 3 is arranged inside the fixed device 2; the clamping teeth 4 are arranged on the lifting structure main body 3; the clamping teeth 4 are engaged with the rotating gears 8; the extending and retraction opening 17 is arranged at the top of the mobile phone main body 1, which facilitates the lifting structure main body 3 to rise and fall through the rotations of the rotating gears 8, thus achieving an effect of lifting the camera main body 12. The camera main body 12 can be hidden inside the mobile phone main body 1 when not in use, and the camera can be better protected. When the camera main body 12 needs to be used, the lifting structure main body 3 rises from the mobile phone main body 1. The mobile phone main body 1 is provided with the movable sealing plates 18, the rotating slots 19, and the rotating blocks 20, and the lifting structure main body 3 is movably connected to the movable sealing plates 18 through the rotating seats 22 and the chutes 21, which facilitates the movable sealing plates 18 to be opened as the lifting structure body 3 rises. Meanwhile, the movable sealing plates can be closed as the lifting structure main body 3 falls, thereby preventing entry of dust when the lifting camera main body 12 is not used. The supporting ring 15 and the sealing gasket 16 are arranged outside the lifting structure main body 3, and the matching slot 13 is arranged on the inner bottom wall of the mobile phone main body 1, so that it is convenient to prevent, through the matching between the sealing gasket 16 and the matching slot 13, the entry of the dust during the rise of the lifting structure main body 3, which achieves a good dustproof effect. The lifting structure main body 3 is provided with the transmission bearings 9, the transmission rods 10, the transmission motor 11, and the camera main body 12. The camera main body 12 is horizontally arranged to facilitate the transmission rods 10 to rotate through the power of the transmission bearings 9 and the power of the transmission motor 11, thereby driving the camera main body 12 to rotate forwards and backwards, allowing the camera to rotate and stop at any angle for photographing.

The above-mentioned camera can not only be used in a mobile phone, but also used in a mobile terminal (also referred to as an intelligent terminal) such as a tablet or a laptop. It should be noted that the mobile terminal is just a term, and terminal devices with computing and processing capabilities can all be referred to as mobile terminals or intelligent terminals.

A camera control method provided in this embodiment can not only control the camera of the above structure, but also control cameras of other structures. This embodiment provides a software control method and a mobile terminal including the software control method. Cameras of any structures can be controlled by the method in this embodiment to achieve the same effect. The mobile terminal can include a screen, a memory, and a processor, and further include: a communication module, a camera, and software. The communication module is configured to achieve communication through a network, wherein the network includes at least one of the following: a mobile communication network, a wireless network, a wired network; the camera is hidden inside the mobile terminal after retracting, and the camera can be driven to extend, retract, and rotate; and the software is used for performing methods in the following embodiments and in optional implementations or preferred implementations.

As a mobile terminal convenient for being held by a user in a hand, the memory, the communication module, and the processor are arranged on an integrated circuit board; one surface of the mobile terminal is the screen, and the other surface of the mobile terminal is a back shell; and the memory, the communication module, the processor, the integrated circuit board, and the camera are located in an interior composed of the screen and the back shell.

The method in the following embodiments can be applied to the mobile terminal described above, but is not limited to this. Other types of devices can also use the method in the following embodiments, and will not be detailed here.

Figure 5:
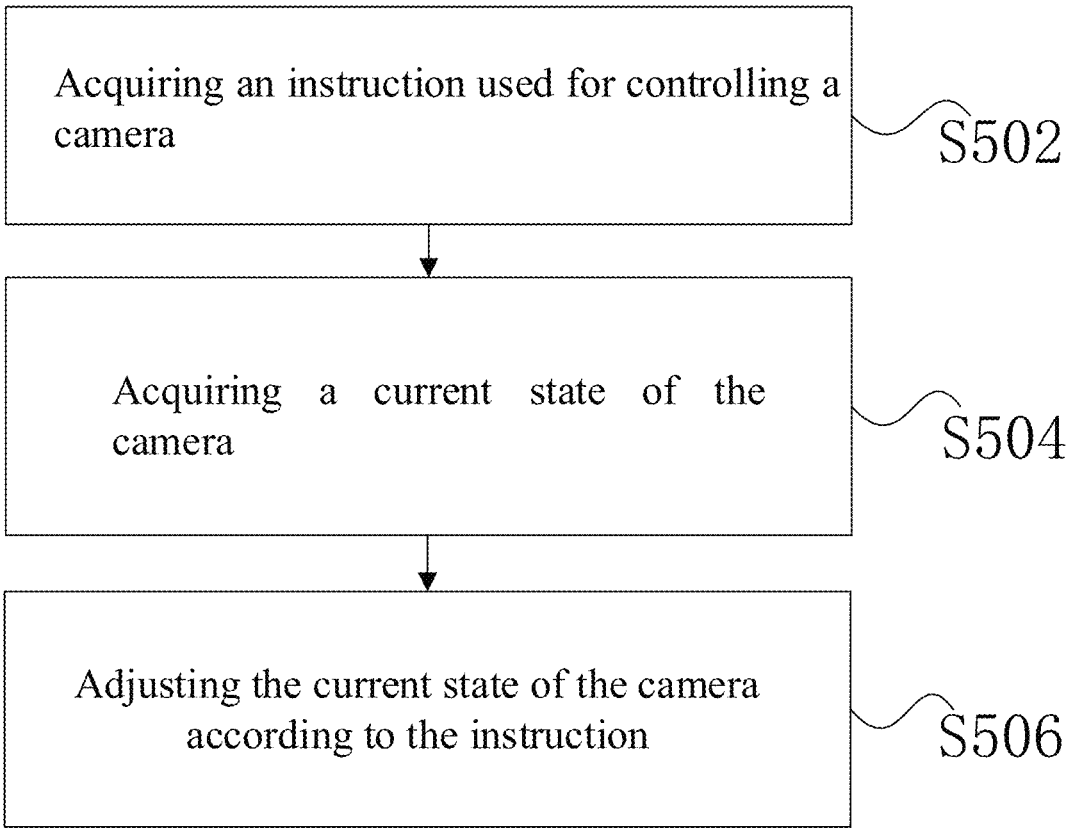
FIG. 5 is a flowchart of a camera control method according to an embodiment of the present disclosure.

This embodiment provides a camera control method. FIG. 5 is a flowchart of a camera control method according to an embodiment of the present disclosure. It should be noted that steps shown in the flowchart in the accompanying drawings can be executed in a computer system such as a set of computer-executable instructions. Furthermore, although a logical order is shown in the flowchart. In some cases, the steps shown or described can be executed in an order different from the order here. As shown in FIG. 5, the camera control method includes the following steps:

Step S502, an instruction used for controlling a camera is acquired, wherein the camera is one of components of a mobile terminal.

Step S504, a current state of the camera is acquired, wherein the state can include at least one of: an extending and retracting state of the camera and a rotating state of the camera, the camera is hidden inside the mobile terminal after retracting, and the camera can be driven to extend, retract, and rotate. There are various driving ways, which can include but not limited to: using a motor for driving. There may be at least one motor. One motor can be used to drive the camera to extend, retract, and rotate, or two different motors can be used to respectively drive the camera to extend, retract, and rotate.

Step S506, the current state of the camera is adjusted according to the instruction.

Through the above steps, the extending and retracting state and/or rotating state of the camera can be adjusted according to the instruction, thus solving the problem of lack of a camera control method because technicians do not realize that the camera needs to be controlled, enriching the camera control methods, improving the applicability of the camera, and providing a possibility for better photographing.

In step S502, the instruction is triggered by input information of a user of the mobile terminal. After the instruction is triggered, the instruction is acquired in step S502. The instruction is used for adjusting the state of the camera according to the input information. This scene mostly occurs when the user needs to use the camera for photographing. For example, if the user desires to take a photo at a predetermined angle, the user can adjust the extending and retracting state and the rotating state of the camera. There are various adjustment ways. Two groups of controls can be displayed on a screen of a terminal. The first group of controls is used for adjusting the extending and retracting state, and the second group of controls is used for adjusting the rotating state. The meaning of "group" used here is that each group includes two button controls. One button is used for enabling the camera to extend out or rotate to the left, and the other button is used for enabling the camera to retract or rotate to the back. In this case, the camera is adjusted by a predetermined amount when a button is clicked on once. If the button is continuously pressed without release, the camera moves smoothly. Preferably, the camera can also be adjusted up and down. In this case, two more buttons can be added. One button is used for enabling the camera to rotate upwards, and one button is used for enabling the camera to rotate downwards. As the number of camera adjustment directions increases, buttons can also be added. Of course, buttons can also be reduced. The buttons here can be virtual buttons displayed on a touch screen, or hardware buttons arranged on a mobile terminal. For example, a volume adjustment button can be used as an adjustment button, and a standby button can be used as a toggle button for switching a camera state adjustment way.

In another way, another way of inputting information can also be used. For example, a sliding way is used. A user inputs a touch signal on the touch screen, wherein the touch signal is a sliding signal, and the sliding signal is used for controlling a speed and/or angle of state adjustment of the camera. For example, when the user is in a predetermined interface, if sliding in a first direction is received, the extending and retracting state is adjusted; and if sliding in a second direction is received, the rotating state is adjusted. The first direction and the second direction are perpendicular. During the adjustment of the rotating state, a three-dimensional ball or a two-dimensional circle can be displayed, and the rotating state is adjusted by receiving a sliding operation performed on the three-dimensional ball or the two-dimensional circle.

The instruction in step S502 can also be triggered by a call command for calling the camera. The call command is sent by an operating system of the mobile terminal or an application installed on the operating system, and the instruction is used for adjusting the state of the camera according to the call command.

For example, if an application needs to call a face recognition function, the application sends a call command to the camera, and the call command is used for instructing the camera to extend out and rotate till it faces the user. The instruction can be the call command itself or can be generated according to the call command, and then the camera is controlled to adjust the state through the instruction.

For another example, an automatic following function can also be added, which means that the camera can move as a subject moves. This type of photographing is referred to as mobile photographing. This moving method can be manually controlled. Manual control can be achieved using the controls described above, and will not be detailed here. This moving method can also be automatic. In this case, a default direction or speed can be used, or the camera can be adjusted for moving photographing according to a direction and speed input by the user.

There is a more intelligent method for enabling the camera to automatically follow the subject. In this method, a movement of a photographing target is acquired at a predetermined cycle; a control instruction is generated according to the movement generated within the predetermined cycle; the instruction is acquired, and the current state of the camera is adjusted according to the acquired instruction, wherein adjustment, indicated by the instruction, of the extending and retracting state and/or rotating state is performed according to the movement of the photographing target; and the adjusted camera follows the photographing target.

In the various photographing situations described above, there may be various camera adjustment methods. These adjustment methods can be flexibly selected according to an actual need. For example, the camera can be controlled to maintain the current state according to the instruction, and photographing is performed. The camera can be controlled to adjust the rotating state after adjusting the extending and retracting state; the camera can be controlled to adjust the extending and retracting state after adjusting the rotating state; the camera can be controlled to adjust both the extending and retracting state and the rotating state simultaneously; the camera can be controlled to only adjust the extending and retracting state; the camera can be controlled to only adjust the rotating state; and the camera can be controlled to be in a state of extending out of the mobile terminal, not retracting.

After the photographing is completed, there are also various ways to control the camera to be turned off, which can be flexibly selected as required. For example, after the photographing is completed, the camera is controlled to be hidden inside the mobile terminal or to be in the same state after the photographing is completed, or the camera is controlled to be adjusted to the state before the instruction is received.

In the above embodiments, when it is necessary to take photos and/or videos, an instruction is sent to the mobile terminal (such as a mobile phone), and then a camera component extends out (or the camera component can first rotate to a front or back surface in the mobile phone and then extend out, or the camera component can rotate while extending). After extending out, the camera component receives a photo taking instruction. For example, if a camera lens does not face a person or object to be photographed, an instruction is sent to the mobile phone, and the camera rotates to a required position for photographing. Rotation can be classified into manually controlled rotation and automatic rotation. The manual rotation refers to manual control: for example, the camera rotates as a finger slides on the screen. The automatic rotation refers to automatic rotation after an instruction is sent: for example, if a certain position on the device is pressed to send an instruction, the camera automatically rotates 180 degrees or 360 degrees at a constant speed/for example, can automatically lock the target and rotate and/or take photos.

After the photographing is completed, an instruction is sent to turn off the camera component. The camera component can retract or not. If it remains outside a machine body, the camera component is in dormancy and/or a standby state.

In the above embodiments, the camera has a photographing function. The photographing function can also include a framing function before photographing. Or, the camera can be used for only framing, not photographing.

This embodiment provides an electronic device, including: a memory and/or a processor. The memory stores a computer program (or referred to as software). The processor is configured to execute the computer program to perform the method in the above embodiments.

The memory can also be referred to as a computer-readable medium. The computer-readable medium includes persistent, non-persistent, movable, and unmovable media that can store information by using any method or technology. The information can be computer-readable instructions, data structures, program modules, or other data. Examples of computer storage media include, but not limited to, a Phase-change Random Access Memory (PRAM), a Static Random Access Memory (SRAM), a Dynamic Random Access Memory (DRAM), other types of RAMs, an ROM, an Electrically Erasable Programmable Read-Only Memory (EEPROM), a flash memory or other internal memory technologies, a CD-ROM, a Digital Video Disk (DVD) or other optical memories, a magnetic cartridge type magnetic tape, a magnetic tape/disk storage device or other magnetic storage devices or any other non-transmitting media, and may be used for storing information that may be accessed by the computing device.

The computer program can be understood as an apparatus. Modules in the apparatus correspond to the steps of the method described above. That is, these computer programs can also be stored in a computer-readable memory that can instruct a computer or another programmable data processing device to work in a specific way, so that instructions stored in the computer-readable memory generate an artifact that includes an instruction apparatus. The instruction apparatus implements a specified function in one or more processes in the flowcharts and/or in one or more blocks in the block diagrams.

Based on this, this embodiment further provides a camera control apparatus, including: a first acquisition module, configured to acquire an instruction used for controlling a camera, wherein the camera is arranged on a mobile terminal; a second acquisition module, configured to acquire a current state of the camera, wherein the state includes at least one of: an extending and retracting state of the camera and a rotating state of the camera, the camera is hidden inside the mobile terminal after retracting, and the camera can be driven to extend, retract, and rotate; and an adjustment module, configured to adjust the current state of the camera according to the instruction.

The instruction is triggered by input information of a user of the mobile terminal, and the instruction is used for adjusting the state of the camera according to the input information; and/or, the instruction is triggered by a call command for calling the camera, wherein the call command is sent by an operating system of the mobile terminal or an application installed on the operating system, and the instruction is used for adjusting the state of the camera according to the call command.

The control module is further configured to control the camera to adjust the state of the camera according to a direction and speed indicated by the instruction, so as to enable the camera to perform mobile photographing.

In a case of controlling the camera to follow a photographing target, the second acquisition module is further configured to: acquire a movement of the photographing target at a predetermined cycle; and the first acquisition module is further configured to: acquire the instruction at the predetermined cycle, and adjust the current state of the camera according to the acquired instruction, wherein adjustment, indicated by the instruction, of the extending and retracting state and/or rotating state is performed according to the movement of the photographing target; and the adjusted camera follows the photographing target.

The adjustment module adjusts the current state of the camera according to the instruction, which includes at least one of the following: controlling the camera to maintain the current state according to the instruction, and performing photographing; or, in a case that the instruction is used for instructing the camera to adjust the extending and retracting state and/or rotating state, controlling, according to the instruction, the camera to adjust the state in one of the following ways: controlling the camera to adjust the rotating state after adjusting the extending and retracting state, controlling the camera to adjust the extending and retracting state after adjusting the rotating state, controlling the camera to adjust both the extending and retracting state and the rotating state simultaneously, controlling the camera to only adjust the extending and retracting state, and controlling the camera to only adjust the rotating state.

The apparatus further includes the control module configured to: control the camera to perform photographing; control, after the photographing is completed, the camera to be hidden inside the mobile terminal or to maintain the state unchanged after the photographing is completed, or control the camera to be adjusted to the state before the instruction is received.

In the above embodiments, the camera can be raised and lowered only without being flipped, flipped only without being raised and lowered, flipped first and then raised and lowered, and raised and lowered first and then flipped. The camera can maintain the extending state without retracting, or can be set to be in "automatic extension and retraction" or "manual extension and retraction". In "automatic extension and retraction", if a photographing instruction is sent, the camera automatically extends out; if the photographing instruction is turned off, the camera automatically retracts; and if a front-camera-on or rear-camera-on instruction is sent, the camera automatically flips or maintains its original state. In the "manual extension and retraction", extension and retraction of the camera are achieved by an additional extension or retraction instruction. After receiving the instruction, the camera extends out or retracts and is not bound to a photographing system. That is, if the user requests to set the camera to be in the "manual extension and retraction", even if the user does not send a camera extension instruction, but only sends a photographing instruction, and the camera does not extend out of the machine body, the camera still performs a photographing operation. The camera can rotate and stop for photographing at any angle, and the angle can be adjusted by sliding by a hand. Or, the camera rotates at a constant speed in a horizontal and/or vertical direction. The lens can take photos or videos in any state including a state where the lens is raised or not raised and hidden inside the machine body. The camera can be flexibly controlled by the above embodiments, so as to provide a possibility for more photographing skills.

It should also be noted that the terms "comprise", "include", or any other variation thereof in the above embodiments are intended to cover a non-exclusive inclusion, so that a process, a method, an article, or a device that includes a list of elements includes those elements and further includes other elements not expressly listed or inherent to such a process, method, article, or device. Without more constraints, an element limited by "includes a . . . " does not preclude the existence of additional identical elements in the process, method, product, or device that includes the element.

The above contents are only the embodiments of the present disclosure, but not intended to limit the present disclosure. Those skilled in the art can make various changes and modifications to the present application. Any modifications, equivalent replacements, improvements and the like that are made without departing from the spirit and the principle of the present application shall all fall within the scope of claims of the present application.

What is claimed is:

1. A camera control method, comprising:
acquiring an instruction used for controlling a camera, wherein the camera is one of constituent parts of a mobile terminal, an extending and retraction opening is formed in a top of the mobile phone main body, and the mobile terminal comprises a lifting structure main body, transmission bearings fixedly mounted on inner walls of left and right sides of the lifting structure main body, and transmission rods movably mounted inside the transmission bearings, the camera main body is fixedly connected between the transmission rods; and the camera main body is capable of rotating 360 degrees between the transmission bearings through the transmission rods both inside the extending and retraction opening and outside the extending and retraction opening;
wherein the instruction is triggered by input information of a user of the mobile terminal, the input information of the user of the mobile terminal comprises a touch signal input by the user on a touch screen, the touch signal is a sliding signal, and the sliding signal is used for controlling a speed and/or angle of state adjustment of the camera, the state adjustment including an extending and retracting state adjustment and a rotating state adjustment of the camera;
acquiring a current state of the camera, wherein the state comprises at least one of:
an extending and retracting state of the camera and a rotating state of the camera, the camera is hidden inside the mobile terminal after retracting, and the camera is driven to extend, retract, and rotate; and
adjusting the current state of the camera according to the instruction.

12

2. The method according to claim 1, wherein
the instruction is triggered by a call command for calling the camera, wherein the call command is sent by an operating system of the mobile terminal or an application installed on the operating system, and the instruction is used for adjusting the state of the camera according to the call command.

3. The method according to claim 2, wherein in a case that the instruction is used for instructing the camera to perform mobile photographing, the adjusting the current state of the camera according to the instruction comprises:
controlling the camera to adjust the state of the camera according to a direction and speed indicated by the instruction, so as to enable the camera to perform mobile photographing.

4. The method according to claim 2, wherein in a case of controlling the camera to follow a photographing target,
the method further comprises: acquiring a movement of the photographing target at a predetermined cycle; and
the acquiring an instruction used for controlling a camera and adjusting the current state of the camera according to the instruction comprises:
acquiring the instruction at the predetermined cycle, and adjusting the current state of the camera according to the acquired instruction, wherein adjustment, indicated by the instruction, of the extending and retracting state and/or rotating state is performed according to the movement of the photographing target; and the adjusted camera follows the photographing target.

5. The method according to claim 2, wherein the adjusting the current state of the camera according to the instruction comprises:
controlling the camera to maintain the current state according to the instruction, and performing photographing; and/or,
in a case that the instruction is used for instructing the camera to adjust the extending and retracting state and/or rotating state, controlling, according to the instruction, the camera to adjust the state in one of the following ways: controlling the camera to adjust the rotating state after adjusting the extending and retracting state, controlling the camera to adjust the extending and retracting state after adjusting the rotating state, controlling the camera to adjust both the extending and retracting state and the rotating state simultaneously, controlling the camera to only adjust the extending and retracting state, and controlling the camera to only adjust the rotating state; and/or,
controlling, according to the instruction, the camera to be in a state of extending out of the mobile terminal, not retracting.

6. The method according to claim 1, wherein after adjusting the current state of the camera according to the instruction, the method further comprises:
controlling the camera for photographing or framing; and
controlling, after the photographing or framing is completed, the camera to be hidden inside the mobile terminal or to be in the same state after the photographing or framing is completed, or controlling the camera to be adjusted to the state before the instruction is received.

7. The method according to claim 1, wherein the camera is driven by at least one motor to extend, retract, and rotate.

8. A mobile terminal, comprising a screen, a memory, and a processor, further comprising:
a communication module, configured to achieve communication through a network, wherein the network comprises at least one of the following: a mobile communication network, a wireless network, a wired network;

a camera, wherein the camera is hidden inside the mobile terminal after retracting, and the camera is driven to extend, retract, and rotate; and software, wherein the software is used for performing the method according to claim 1.

9. The mobile terminal according to claim 8, wherein the memory, the communication module, and the processor are arranged on an integrated circuit board; one surface of the mobile terminal is the screen, and the other surface of the mobile terminal is a back shell; and the memory, the communication module, the processor, the integrated circuit board, and the camera are located in an interior composed of the screen and the back shell.

10. An electronic device, wherein the electronic device is a processor or a memory, wherein in a case that the electronic device is the processor, the electronic device is configured to execute software; in a case that the electronic device is the memory, the electronic device is configured to store software; and the software is used for performing the method according to claim 1.

11. A camera control apparatus, comprising:

a first acquisition module, configured to acquire an instruction used for controlling a camera, wherein the camera is arranged on a mobile terminal, an extending and retraction opening is formed in a top of the mobile phone main body, and the mobile terminal comprises a lifting structure main body, transmission bearings fixedly mounted on inner walls of left and right sides of the lifting structure main body, and transmission rods movably mounted inside the transmission bearings, the camera main body is fixedly connected between the transmission rods; and the camera main body is capable of rotating 360 degrees between the transmission bearings through the transmission rods both inside the extending and retraction opening and outside the extending and retraction opening;

wherein the instruction is triggered by input information of a user of the mobile terminal, the input information of the user of the mobile terminal comprises a touch signal input by the user on a touch screen, the touch signal is a sliding signal, and the sliding signal is used for controlling a speed and/or angle of state adjustment of the camera, the state adjustment including an extending and retracting state adjustment and a rotating state adjustment of the camera;

a second acquisition module, configured to acquire a current state of the camera, wherein the state comprises at least one of: an extending and retracting state of the camera and a rotating state of the camera, the camera is hidden inside the mobile terminal after retracting, and the camera is driven to extend, retract, and rotate; and an adjustment module, configured to adjust the current state of the camera according to the instruction.

12. The method according to claim 1, wherein two movable sealing plates are movably mounted inside the extending and retraction opening, the lifting structure main body is movably connected to the movable sealing plates through rotating seats and chutes, thereby facilitating the movable sealing plates to be opened when the lifting structure main body is driven to rise.

13. The method according to claim 12, wherein the sliding signal comprises a first direction sliding signal responding to a sliding in a first direction, and a second direction sliding signal responding to a sliding in a second direction, if the first direction sliding signal is received, the extending and retracting state is adjusted; and if the second direction sliding signal is received, the rotating state is adjusted, and the first direction and the second direction are perpendicular to each other.

14. The camera control apparatus according to claim 11, wherein two movable sealing plates are movably mounted inside the extending and retraction opening, the lifting structure main body is movably connected to the movable sealing plates through rotating seats and chutes, thereby facilitating the movable sealing plates to be opened when the lifting structure main body is driven to rise.

15. The camera control apparatus according to claim 14, wherein the sliding signal comprises a first direction sliding signal responding to a sliding in a first direction, and a second direction sliding signal responding to a sliding in a second direction, if the first direction sliding signal is received, the extending and retracting state is adjusted; and if the second direction sliding signal is received, the rotating state is adjusted, and the first direction and the second direction are perpendicular to each other.

* * * * *